(12) United States Patent
Morales Cerda et al.

(10) Patent No.: US 7,837,760 B2
(45) Date of Patent: Nov. 23, 2010

(54) PROCESS TO INCREASE THE BIOLEACHING SPEED OF ORES OR CONCENTRATES OF SULFIDE METAL SPECIES, BY MEANS OF CONTINUOUS INOCULATION WITH LEACHING SOLUTION THAT CONTAINS ISOLATED MICROORGANISMS, WITH OR WITHOUT PRESENCE OF NATIVE MICROORGANISMS

(75) Inventors: Pedro Antonio Morales Cerda, La Reina (CL); Ricardo Badilla Badilla Ohlbaum, La Reina (CL)

(73) Assignee: Biosigma S.A., Colina (CL)

( * ) Notice: Subject to any disclaimer, the term of this patent is extended or adjusted under 35 U.S.C. 154(b) by 25 days.

(21) Appl. No.: 11/862,035

(22) Filed: Sep. 26, 2007

(65) Prior Publication Data

US 2008/0127779 A1 Jun. 5, 2008

(30) Foreign Application Priority Data

Oct. 27, 2006 (CL) .................................. 2911-2006

(51) Int. Cl.
*C22B 15/00* (2006.01)
*C22B 3/18* (2006.01)
(52) U.S. Cl. ............................. 75/743; 75/710; 75/712; 75/744; 423/27; 423/658.5
(58) Field of Classification Search ................... 75/712, 75/743, 744, 710; 423/27, 658.5, DIG. 17
See application file for complete search history.

(56) References Cited

U.S. PATENT DOCUMENTS 4,987,081 A * 1/1991 Hackl et al. .................. 435/262

(Continued)

FOREIGN PATENT DOCUMENTS

CL 16741997 6/1997

(Continued)

OTHER PUBLICATIONS

Das et al., Factors affecting bioleaching kinetics of sulfide ores using acidophilic micro-organisms, 1999, BioMetals, vol. 12, p. 1-10.*

(Continued)

*Primary Examiner*—Emily M. Le
*Assistant Examiner*—Jared Wood
(74) *Attorney, Agent, or Firm*—Merchant & Gould P.C.

(57) ABSTRACT

The invention publishes a process to increase the bioleaching speed of ores or concentrates of sulfide metal species in heaps, tailing dams, dumps, or other on-site operations. The process is characterized by the continuous inoculation of the ores or concentrates with isolated microorganisms of the *Acidithiobacillus thiooxidans* type, together with isolated microorganisms of the *Acidithiobacillus ferrooxidans* type, with or without native microorganisms, in such a way that the total concentration of microorganisms in the continuous inoculation flow is of around $1\times10^7$ cells/ml to $5,6\times10^7$ cells/ml. In particular, the invention publishes the continuous inoculation of *Acidithiobacillus thiooxidans* Licanantay DSM 17318 together with *Acidithiobacillus ferrooxidans* Wenelen DSM 16786 microorganisms, or with other native microorganisms at a concentration higher than $5\times10^7$ cells/ml. In addition to the inoculation of isolated bacteria, the invention includes the addition of oxidizing agents such as the ferric ion produced externally, together with nutrients in the shape of salts of ammonium, magnesium, iron, potassium, as well as air enriched continuously with carbon dioxide to promote bacterial action in the bioleaching process of ores or concentrates.

16 Claims, 4 Drawing Sheets

U.S. PATENT DOCUMENTS

| | | | |
|---|---|---|---|
| 5,763,259 A | | 6/1998 | Panos |
| 5,873,927 A | * | 2/1999 | Schaffner et al. ............. 75/710 |
| 6,110,253 A | | 8/2000 | Kohr et al. |
| 6,207,443 B1 | * | 3/2001 | King .......................... 435/262 |
| 6,284,530 B1 | | 9/2001 | Sharp et al. |
| 2003/0167879 A1 | | 9/2003 | Batty et al. |
| 2004/0091984 A1 | | 5/2004 | Hunter |
| 2005/0066773 A1 | * | 3/2005 | Harlamovs et al. ............ 75/721 |
| 2006/0094094 A1 | * | 5/2006 | Sugio et al. ................. 435/168 |
| 2007/0042482 A1 | * | 2/2007 | Ohata et al. ................. 435/168 |

FOREIGN PATENT DOCUMENTS

| | | | |
|---|---|---|---|
| CL | 02101-2005 | * | 3/2006 |
| WO | WO 00/71763 | | 11/2000 |
| WO | WO 03/068999 | | 8/2003 |
| WO | WO 2004/027100 | | 4/2004 |

OTHER PUBLICATIONS

English language translation of Chilean patent application CL 02101-2005 which was published on Mar. 31, 2006.*

Abdel-Fattah et al. "Numerical Modeling of Ferrous-ion Oxidation Rate in *Acidithiobacillus ferrooxidans* ATCC 23270: Optimization of Culture Conditions Through Statistically Designed Experiments." *Acta Microbiologica Polonica*. vol. 51. No. 3. 2002. pp. 225-235.

Clark et al. "Biotechnology in minerals processing: Technological breakthroughs creating value." *Hydrometallurgy*. vol. 83. 2006. pp. 3-9.

Espejo et al. "Bacterial Community in Copper Sulfide Ores Inoculated and Leached with Solution from a Commercial-Scale Copper Leaching Plant." *Applied and Environmental Microbiology*. vol. 63. No. 4. 1997. pp. 1344-1348.

Gericke et al. "Inoculation of Heap-Leaching Operations." *Proceedings of the 16th International Biohydrometallurgy Symposium*. 2005. pp. 255-264.

Lizama et al. "The Teck Cominco Hydrozinc™ Process." *Hydrometallurgy* vol. 2. 2003. pp. 1503-1516.

Okibe et al. "Enumeration and Characterization of Acidophilic Microorganisms Isolated from a Pilot Plant Stirred-Tank Bioleaching Operation." *Applied & Environmental Microbiology*. vol. 69. No. 4. 2003. pp. 1936-1943.

Rawlings et al. "Heavy Metal Mining Using Microbes." *Annu. Rev. Microbial*. vol. 56. 2002. pp. 65-91.

Rawlings et al. "Biomineralization of metal-containing ores and concentrates." *Trends in Biotechnology*. vol. 21. No. 1. 2003. pp. 38-44.

Sugio et al. "Existence of a Hydrogen Sulfide: Ferric Ion Oxidoreductase in Iron-Oxidizing Bacteria." *Applied & Environmental Microbiology*. vol. 58. No. 1. 1992. pp. 431-433.

Tshilombo et al. "Mechanism and kinectis of chalcopyrite passivation during bacterial leaching." *Cooper 2003-Cobre 2003*. vol. 4. 2003. pp. 99-116.

Uhrie et al. "The metallurgical development of the Morenci MFL project." *Cooper 2003-Cobre 2003*. vol. 4. 2003. pp. 29-37.

Wood et al. "Ferrous sulphate oxidation using *Thiobacillus ferrooxidans* cells immobilized on sand for the purpose of treating acid mine-drainage." *Appl. Microbiol Biotechnol*. vol. 56. 2001. pp. 560-565.

Chilean Mining Journal 2004. No. 279. pp. 65-80.

* cited by examiner

PROCESS TO INCREASE THE BIOLEACHING SPEED OF ORES OR CONCENTRATES OF SULFIDE METAL SPECIES, BY MEANS OF CONTINUOUS INOCULATION WITH LEACHING SOLUTION THAT CONTAINS ISOLATED MICROORGANISMS, WITH OR WITHOUT PRESENCE OF NATIVE MICROORGANISMS

BACKGROUND OF THE INVENTION

The invention publishes a process to increase the bioleaching speed of ores or types of sulfide metal concentrated in heaps, tailings ponds, dumps, or other "in-situ" (on-site) operations. The process is characterized by the continuous inoculation of the ore or concentrates with solutions that contain microorganisms of an *Acidithiobacillus thiooxidans* type, together with microorganisms of an *Acidithiobacillus ferrooxidans* type, with or without the presence of native microorganisms, in such a way that the total microorganism concentration in the continuous inoculation flow is higher than $1 \times 10^7$ cells/ml to $5 \times 10^9$ cells/ml. In addition, these solutions are characterized as having a content of ferric ions in the inoculation solution of more than 2 g/L. The continuous inoculation is carried out until the bioleaching process is self-sustaining. In particular, the invention publishes the continuous inoculation of *Acidithiobacillus thiooxidans* Licanantay DSM 17318 together with *Acidithiobacillus ferrooxidans* Wenelen DSM 16786 microorganisms, or with other native microorganisms at a concentration of over $5 \times 10^7$ cells/ml and with nutrient and ferric ion contents of 2 to 5 g/L so that the potential of the solution is higher than 800 mV (measured in reference to the hydrogen electrode) produced by the bio-oxidizing reactions of the iron in the biomass production reactors.

SUMMARY OF THE INVENTION

At present, at a global level, less than 10% of copper is obtained from ore in which copper is found in an oxidized state which is easily soluble in acid and which is processed by acid leaching, followed by metal solvent extraction and electro-winning processes, in what is known as the hydrometallurgical form of obtaining copper. This form is very attractive because of its low operational and investment costs in comparison to other conventional technologies, besides causing a lower environmental impact. However, the application of this technology is limited to oxide ore, or to the case of mixed sulfide copper ores in which the metal is present in the form of secondary sulfides (chalcosite or covellite), which are acid-soluble in the presence of a high energy oxidizing agent catalyzed by microorganisms (Uhrie, J L, Wilton, L E, Rood, E A, Parker, D B, Griffin, J B and Lamana, J R, 2003, "*The metallurgical development of the Morenci MFL Project*" Copper 2003 *Int Conference Proceedings*, Santiago, Chile, Vol VI, 29-39).

On the other hand, over 90% of world mine copper is obtained from processing copper sulfide ores. The main types of copper sulfides found in the ore are: chalcopyrite, bornite, chalcosite, covellite, tennantite and enargite, with chalcopyrite as the species of most relative abundance, and therefore the one that holds the most financial interest.

Currently, copper sulfide ores are processed using technologies based on physical and chemical processes associated to crushing, milling, ore flotation, followed by the fusion-conversion of concentrates and electrolytic refining of the metal. In practice, over 80% of copper is produced by processing ore in the way described above—known as conventional—which is limited to high and medium grade ore, according to the specific characteristics of the deposits and of the ore processing plants. Because of this, there are extensive and valuable relatively low grade ore resources, which with conventional technologies are not financially viable, and remain unexplored due to the lack of effective beneficiation technology.

For a long time, it has been established that the solubilization or leaching of sulfide ore is favored by the presence of iron and sulfur-oxidizing bacteria, a process known as bioleaching (see for example the review by Rawlings D E; *Biomineralization of metal-containing ores and concentrates, TRENDS in Biotechnology*, Vol. 21 No. 1, p 38-42, 2003).

Working this ore at a commercial scale by leaching heaps or dumps that contain secondary sulfides such as covellite (CuS) and chalcosite ($Cu_2S$) using mesophillic microorganisms at a temperature range of 25-45° C., satisfactory recovery and extraction speeds are obtained, thus making the process financially feasible. In the indicated temperature range, the most amply described bacteria present in the ore are of the *Acidithiobacillus* and *Leptospirillum* genus, of which, the most common species are *A. ferrooxidans, A thiooxidans*, and *L. ferrooxidans* (Espejo R T and Romero, J., 1997, "*Bacterial community in copper sulfide ores inoculated and leached with solutions from a commercial-scales copper leaching plant*", *Applied & Environmental Microbiology*, Vol 63, 4, 183-187). These bacteria grow by using the energy sources available in the environment associated with the process and the iron in the solution from the leaching of iron composites present in the ores.

However, in the case of chalcopyrite ores ($CuFeS_2$), the best-known microorganisms show a very low leaching speed, and therefore, in industrial operations, the fraction of copper associated with chalcopyrite that is recovered is considered negligible. One possible explanation, among others, is that a film that forms on the surface of the chalcopyrite would stop the copper solubilization process, a phenomenon known as passivation (Tshilombo and Dixon D G; *Mechanism and kinetics of chalcopyrite passivation during bacterial leaching. Proceedings of Copper* 2003, 5th *international Conference* Vol. VI, Book 1, p 99-116).

Passivation of the bacteria is avoided in the StickiBugs™ process. The bacteria have adhesive polymers on their surfaces that stick to porous materials, forming a film that prevents the bacterial solution from penetrating the heaps to be bioleached. This process consists in preparing non-adhesive bacteria by suppressing an essential nutrient for their cultivation. This production of bacteria subjected to under-nourishment generates ultra-micro bacteria of less than 0.4 µm. The publication "*Inoculation of Heap-leaching Operations*" M. Gericke, et al, 16th International Bio-hydrometallurgy Symposium, Cape Town, South Africa, Sep. 25-29 2005, contains research on the effect of limiting nitrogen, carbonate, decreasing pH and lack of ventilation and of agitation in bacterial cultivation as measures to reduce their adhesiveness. They are then incorporated by means of a solution to the ore heaps, to then, once they have penetrated in the ore head, incorporate the missing nutrients and reactivate these bacteria that recover their adhesive properties.

To avoid the passivation phenomenon and obtain performances that will make the process economically feasible, in state-of-the-art processes, high temperatures ranging from 75 to 80° C. are used (Rawlings D E, *Heavy metal mining using microbes (Annu Rev Microbiol;* 56:65-91, 2002). For example, as indicated in the U.S. Pat. No. 6,110,253 and US 20030167879 patent processes, extreme thermophilic microorganisms (archaea) are used both in heaps and in stirred tanks.

In the case of U.S. Pat. No. 6,110,253, the bacteria used are specifically inoculated, and are of different types depending on the temperature of the system, which increases with the purpose of finally operating with the extreme thermophilic bacteria. As observed in the examples provided in this document, in order to reach the operating condition of these microorganisms, it is necessary to increase the temperature externally, which represents both an increase in additional costs and in operating difficulties. On the other hand, regarding the use of stirred tanks for leaching, it is possible to point out that the conditions obtained, particularly the high quantity of resulting bacteria (over $10^{10}$ per millimeter) when leaching ore concentrates, are not possible to achieve commercially in ore beneficiation processes carried out in troughs, heaps, dumps, tailing dams and other "in-situ" (on-site) processes.

Furthermore, in the industrial leaching of ores containing chalcopyrite, numerous microorganisms have been found; for example the use of organisms of the *Leptospirillum* and *Sulfobacillus* genus has been described, (Okibe N, Gericke M, Hallberg K B, Johnson D B., "Enumeration and characterization of acidophilic microorganisms isolated from a pilot plant stirred-tank bioleaching operation." Appl Environ Microbiol., 69(4):1936-43, 2003). However, the difficulty in isolating, growing and storing them makes their use difficult. Another relevant organism in the leaching process is the microorganism of the genus *Acidithiobacillus* that presents a wide diversity of homologies in the genome, from 60 to 70% in the species, and as low as 20 to 30% in the genus.

For example, patent EP0004431 mentions the use of the *Thiobacillus ferrooxidans* species (now named *Acidithiobacillus ferrooxidans*) for the bioleaching of chalcopyrite, with strains that can operate at a pH of 1.0. Other examples of this same species are the strains deposited in the American Type Culture Collection, ATCC 19.859; ATCC 33.020 (Sugio T, et al. *"Existence of a hydrogen sulfide: Ferric ion oxidoreductase in iron-oxidizing bacteria."* Appl. Environ. Microbiol. 58: 431-433, 1992.); ATCC 23.270, (Abdel-Fattah et al. *"Numerical modeling of ferrous-ion oxidation rate in Acidithiobacillus ferrooxidans ATCC 23270: optimization of culture conditions through statistically designed experiments"* Acta Microbiol Pol. 2002; 51(3):225-35), etc. In addition, a new *Acidithiobacillus ferrooxidans* species named Wenelen was recently isolated and is deposited in the Deutsche Sammlung von Mikroorganismen und Zellkulturen GmbH—DSMZ, under number DSM 16786, which shows improved activity for chalcopyrite bioleaching (patent CL 2731-2004).

Several other documents raise the subject of inoculation of microorganisms, for example WO2004027100 publishes the inoculation of microorganisms in a heap, but does not indicate what type of microorganisms, or the concentrations in which these microorganisms are incorporated into the heap. Likewise, WO0071763 presents a type of inoculation that consists in using acid water with bacteria of a thermophilic type. However, it also omits the concentration in which the microorganisms are used. On the other hand, U.S. Pat. No. 5,763,259 proposes inoculation with native microorganisms or with microorganisms obtained from the ore to be worked, but in this case, the purpose is to obtain oxidized products in a solid state, and inoculation is only practiced at the beginning of the process. Finally, WO03068999 divulges the use of an aerosol that contains microorganisms and nutrients, but it also omits to indicate the concentration or type of microorganisms, neither does it provide an example of its application on copper sulfide ores.

Another example is the Hydrozinc™ process flow chart, developed on the basis of the results described by Lizama et al. (Lizama, H. M., Harlamovs, J. R., Bélanger, S., Brienne, S. H. *"The Teck Cominco Hydrozinc™ process"*. *Hydrometallurgy* 2003-*Fifth International Conference in Honor of Professor Ian Ritchie*), which does not explicitly include inoculation of the leach heap as part of the process.

In the same vein, document CL 1674-1996 contains a proposal to leach ore by continuously adding aqueous suspensions to stirred tanks or reactors containing populations of bacteria that carry out the leaching of these ores, preserving the necessary physical and chemical conditions, such as temperature, percentage of solids, etc. This document does not mention if the isolated microorganisms are used, but states that the microorganisms used are native. Neither does it mention the inoculation of leach heaps, but stresses the use of reactors, and stirred tanks.

In certain cases of heap leaching, starting from the assumption that leaching occurs by means of an indirect mechanism, the use of bacteria has been advocated to regenerate the Fe(III) ion required for leaching, making use of the microorganisms present in the heap to bring about this regeneration of Fe(III). For example, the use of Fe(III) regeneration systems has been proposed, either with ancillary heaps built using waste rock colonized with iron-oxidizing bacteria (Hunter, C. J. patent application No US 2004/0091984A1), or by means of columns filled with immobilized bacteria in some solid substratum, such as quartz (Wood, T. A., Murray, K. R., Burgess, J. G. 2001. *"Ferrous sulphate oxidation using Thiobacillus ferrooxidans cells immobilised on sand for the purpose of treating acid mine-drainage"*. Appl. Microbiol. Biotechnol. 56: 560-565) or *BIOBALLS* (Sharp, J. E., Stuffle, K. L., Karlage, K. L., Young, T. L., U.S. Pat. No. 6,284,530). However, U.S. Pat. No. 6,284,530 does not indicate the precise concentration of cells to be used, and in U.S. Pat. No. 6,284,530, the microorganisms are not inoculated. Besides, the iron-oxidizing activity and growth of the immobilized bacteria inside the ore heaps or filled columns are limited by the lack of nutrients and oxygen and therefore, the resulting speeds are at least lower than those obtained in reactors, which is overcome when applying the protocols of the present invention.

From the point of view of sulfide ore hydrometallurgy, taking the case of copper as an example, the leaching reactions of sulfide ores are generally represented as follows:

$$\text{Chalcosite: } Cu_2S + Fe_2(SO_4)_3 \rightarrow CuS + CuSO_4 + 2FeSO_4 \quad (1)$$

$$\text{Covellite: } CuS + Fe_2(SO_4)_3 \rightarrow CuSO_4 + 2FeSO_4 + S° \quad (2)$$

$$\text{Bornite: } Cu_5FeS_4 + 2Fe_2(SO_4)_3 \rightarrow Cu_3FeS_4 + 2CuSO_4 + 4FeSO_4 \quad (3)$$

$$\text{Chalcopyrite: } CuFeS_2 + 2Fe_2(SO_4)_3 \rightarrow CuSO_4 + 5FeSO_4 + S° \quad (4)$$

$$\text{Sulfur: } S° + H_2O + 1\tfrac{1}{2}O_2 \rightarrow H_2SO_4 \quad (5)$$

where reactions (2), (3), (4) and (5) are slow and occur when catalyzed by leaching bacteria. The same bacteria oxidize the resulting ferrous sulfate according to:

$$\text{Ferrous Sulfate: } 2FeSO_4 + H_2SO_4 + \tfrac{1}{2}O_2 \rightarrow Fe_2(SO_4)_3 + H_2O \quad (6)$$

originating the process known as bioleaching, due to the oxidizing activity of the bacteria in the solution or forming bio-films over the ore on the iron and sulfur that results from the process. In the bio-leaching of secondary sulfide copper ore, the bioleaching speed depends on the concentration of ferric ion, and therefore, in practice is limited by the re-oxidation speed of the ferrous ions (6) which is slow within the ores.

Data published on industrial operations such as those of Minera Escondida (Clark, M. E., Batty, J. D., van Buuren, C. B., Dew, D. W. and Eamon, M. A., "Biotechnology in mineral processing: technological breakthroughs creating value", Hydrometallurgy, 2006, at press) show that industrial recovery, even in the case of secondary ore is of 900 days for a total recovery of 65% of copper content. Data from plants published by the Quebrada Blanca and Cerro Colorado operations, also show cycles of 480 to 500 days for recovery of 65 to 80% of copper content in copper ores of a secondary type, with copper mainly in the form of chalcosite and covellite (see for example Chilean Mining Journal 2004. N. 279. pp. 65-80).

As observed, the industrial practice of bioleaching operations in heaps, tailing dams, dumps, and other on-site operations does not contemplate the explicit inoculation of leaching bio-mass from isolated strains, on their own or mixed with native micro-organisms, that show activity increased to a regular concentration. This is particularly necessary in the early stages of this process when the bioleaching reactions of secondary ores, such as chalcosite, require high concentrations of bacteria and ferric ion, so that the copper recovery speed is not limited by these factors and its self-sustainability guaranteed, understanding this as the fact that the cell count at the end of the on-site operation is similar in quantity and in distribution to the added inoculum. The supply of iron, over the 2 g/l values, as ferric ion contained by the industrial raffinate solutions used for irrigation, considerably decreases ore bioleaching times, by ensuring their presence in excess in accordance with the stechiometry of the bioleaching reactions (reactions 1 to 6).

Therefore, as far as we know, we are able to assert that there is still a need for a process to improve the bioleaching conditions of sulfide metal ores, particularly that of sulfide ores such as chalcopyrite, bornite, chalcosite, covellite, tennantite and enargite, by adding a leaching biomass of improved bacterial activity (iron and sulfur oxidization) and simultaneously, sufficiently high concentrations of ferric ion to ensure sufficiently high speeds in the sulfide ore leaching to enable the processing of these ores, especially those with a low grade, to be financially feasible.

DESCRIPTION OF THE INVENTION

Figure 1:
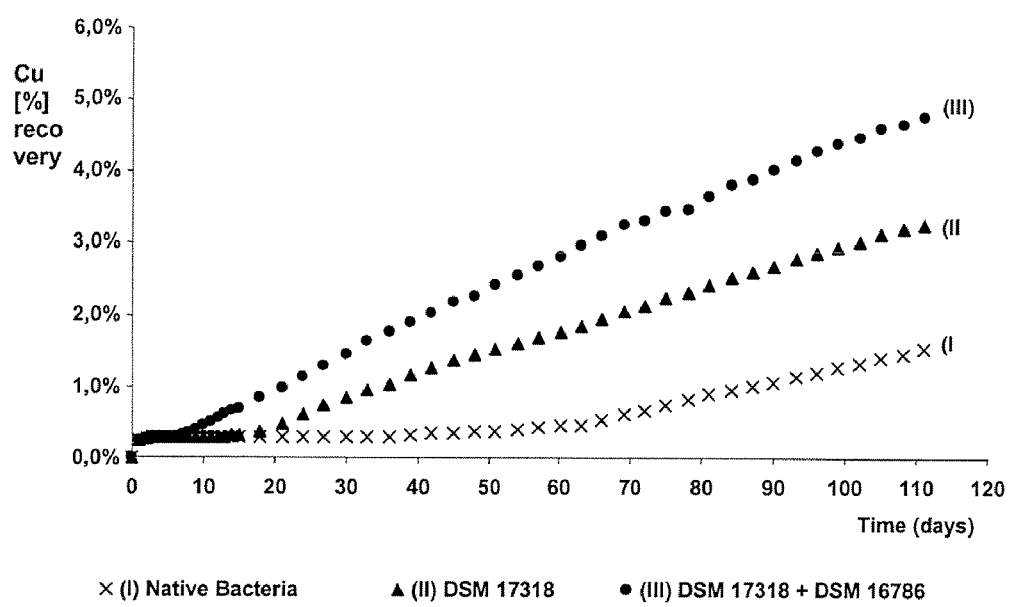
FIG. 1: This figure shows the copper recovery results for a column filled mainly with chalcopyrite, using (i) only native bacteria; (ii) using continuous inoculation of Licanantay DSM 17318 bacteria; and (iii) using continuous inoculation of the Licanantay DSM 17318 and Wenelen DSM 16789 bacteria association.

The following terms are explained, for a better understanding of the process:

a) Ore bioleaching in troughs: a process that is carried out in a tank with a false bottom where the ore is loaded, and flooded with the leaching solution which is made to circulate through the ore particles, in the presence of acidophilic microorganisms, extracting the copper dissolved in an acid solution.

b) Ore bioleaching in stirred tanks or reactors: the bioleaching process takes place in a mechanically stirred tank where the finely divided ore is mixed with the leaching solution, forming a slurry with a solid content of up to 20%, with the presence of acidophilic microorganisms, extracting the copper dissolved in an acid solution.

c) Bioleaching ore in heaps: in this process, the ore crushed to a specific grading is piled onto a waterproof surface, with a slight slope. The surface is then irrigated with leaching solution, in the presence of acidophilic microorganisms, and the copper dissolved in an acid solution is extracted from the base.

d) Bioleaching of ores in dumps: ores below the cut-off grade, which are extracted from an open pit mine, are stored as run of mine or after primary crushing, in gorges that have the appropriate characteristics to control the infiltration of solutions or on surfaces where a waterproof sheet has been previously installed. The surface is irrigated with leaching solution, in the presence of acidophilic micro-organisms, and the copper dissolved in an acid solution is extracted from the base.

e) Bioleaching of tailing ponds: the tailings that come from the flotation process and contain lower quantities of the metal present in the ore are stored in dams, from where they are then extracted for leaching, either in heaps or by stirring, in the presence of acidophilic microorganisms, extracting the copper dissolved in an acid solution.

f) Bioleaching of "in-situ" (on-site) ore: deposits of ore in its natural state or fractured during previous mining operations are directly leached on-site, irrigating the surface with leaching solution, in the presence of acidophilic microorganisms, and the copper dissolved in an acid solution is extracted from the base.

g) Inoculum: pure or mixed bacterial culture which will act as active biological material during the bioleaching process.

h) ATCC: "American Type Culture Collection".
i) DSM: "Deutsche Sammlung von Mikroorganismen und Zellkulturen GmbH" German type culture collection.
j) Biomass: is the quantity of live organisms produced in a specific area or volume.
k) Raffinate: copper-depleted aqueous solution, resulting from the process of extracting copper by solvents from leached solutions in industrial operations.
l) PLS: aqueous solution generated during the bioleaching process that contains the metallic ions that have been leached from the ore heaps, dumps or other processes. This solution constitutes the feed for the PLS solvent extraction plant.
m) Passivation: decrease in specific leaching speed of ore as a consequence of the accumulation of surface components such as layers of sulfur and poli-sulphurs, among others.
n) Native bacteria: microorganisms that are naturally found in mine or process ore, concentrates or solutions and that show activity or growth under the conditions applied during bioleaching.
o) Iron-oxidizing activity: generation of ferric ions from ferrous ions by the metabolic action of the microorganisms
p) Iron-oxidizing self-sustainability: moment in a leaching process when the iron content, as ferric ion, in the effluent solutions is the same as that of the irrigating solutions, with an oxidizing potential of more than 800 mV (in reference to the potential of a hydrogen electrode), as a result of the iron-oxidizing activity of the bacteria in the bioleaching processes being higher than the demand of ferric ions due to the bioleaching reactions.
q) Bacterial self-sustainability: Moment in a bioleaching process when the bacterial count in the effluent solutions is similar in magnitude and composition to the biomass present in the inoculating or irrigating solution in the bioleaching process of ore or concentrates.

In order to improve the conditions for extracting copper from sulfide ore or concentrates that are stationary, arranged in heaps, tailing dams, dumps or other on-site operations, and particularly from sulfide metal ores or concentrates, a process was developed to make it possible, on one hand, to increase the concentration of the microorganisms that participate in the leaching of this ore, and on the other, to avoid the phenomenon of ore passivation due to the biooxidizing of the sulfur-containing composites that gather on the surface.

The increase in the concentration of microorganisms responsible for leaching in heaps, tailings dams, dumps and other on-site situations up to typical levels found in reactors, and the increase in the concentration of ferric ions, make it possible to significantly increase the speed of copper extraction from the ore that contains it. Naturally this occurs because the copper extraction speed is directly related to the number of microorganisms present and to the concentration of oxidizing ions (ferric iron).

The increase in the concentration of microorganisms is equivalent to an increase in two orders of size regarding the size of the biomass present in conventional processes, in which the populations are lower that $2 \times 10^6$ cells per milliliter. In addition to this, the ferric iron concentration is higher than 2 g/l in the irrigating solution, the normal limit in previous state of the art processes that use raffinate solutions.

Furthermore, avoiding the passivation phenomenon, which consists in the depositing of a layer of sulfur or poly-sulphurs on the ore, enables the metallic species to remain exposed to the leaching action, whether of the microorganisms present or of chemical species, as for example, iron (III), that participate in the leaching. Consequently, the speed with which copper is extracted from the host ore also improves.

To increase the concentration of microorganisms in heaps, tailing dams, dumps and other on-site operations, the continuous inoculation of specific microorganisms known for their higher level of activity on the ore to be worked, is contemplated. Thus, a larger microorganism population causes faster leaching. Furthermore, to avoid the passivation phenomenon, inoculation of specific microorganisms known for their higher level of activity on sulfide species is contemplated, in order for them to remove by means of oxidation the layer of sulfur and poly-sulphides deposited on the ore that makes leaching slower or prevents it.

At the same time that micro-organisms are added, especially during the first stages of the process, and until iron-oxidizing self-sustainability is achieved by the iron-oxidizing microorganisms present in heaps, tailing dams, dumps, or other on-site operations, by the consumption of ferric iron by the bioleaching reactions of the sulfides (reactions 1 to 4), the speed of the process increases significantly when oxidizing (ferric) ions are added to the ore inoculation and irrigation solutions.

In order to carry out the three indicated improvements simultaneously, the incorporation of a leaching biomass flow at a concentration higher than $5 \times 10^7$ cells/mL, a flow which in addition contains ferric ions, in concentrations that vary depending on the process stage, during the operating time considered necessary, for example, until the process is self-sustaining. This bioleaching flow comprises a mixture of *Acidithiobacillus thiooxidans* and *Acidithiobacillus ferrooxidans* type microorganisms, with or without other native microorganisms present in the solution, and ferric ions. This mixture is irrigated on the heaps, tailing dams, dumps or other on-site operations, in order to increase the leaching speed.

One of the forms of application is to mix the flow of biomass with the flows that are currently used to irrigate heaps, dumps, tailing ponds or other on-site operations beforehand, with or without ferric ions before this flow is used to irrigate the heaps, tailing ponds, dumps or other on-site operations. In another kind of application, the biomass flow, with or without ferric ions, is applied separately on heaps, dumps, tailing dams or other on-site operations.

The application of a process such as the one described, may be carried out constantly throughout the useful lifespan of the on-site operation, or may be verified during part of the previously-mentioned operation, for example at the beginning, end, or during an intermediate period in the lifespan of that operation. Conventionally, the application of this process is carried out at the beginning of the on-site operation, until the heap, dump, tailing dam or similar situation becomes self-sustaining; in other words, until the operation effluent shows a quantity and distribution of bacteria and iron species that are comparable to those in the irrigating solution.

As explained previously, the inoculation of an *Acidithiobacillus thiooxidans-Acidithiobacillus ferrooxidans* bacterial association, with or without native micro-organisms, makes it possible to enhance the recovery of copper from sulfide metal concentrates or ore. In an analogous way, the simultaneous addition of ferric ions, especially during the initial stages of the process, also speeds up the process. These improvements become even more evident in the examples presented below.

Example 1

In order to compare the bioleaching activity of native bacteria, without inoculation of microorganisms, with the continuous inoculation of an *Acidithiobacillus thiooxidans* microorganism type, represented here by Licanantay DSM 17318, and with continuous inoculation of the association formed by Wenelen DSM 16786 (*Acidithiobacillus ferrooxidans*) and Licanantay DSM 17318, a sample of primary ore from the Codelco—Chile El Teniente Mine was used, composed mainly by chalcopyrite (96.6%). The ore sample was bioleached in mini-columns in order to simulate industrial processing conditions in heap or dump leaching. The experiment was carried out according to the following protocol:

1. Columns were manufactured from vinyl polychloride tubes with an internal diameter of approximately 40 mm, filled with ore packed to a height of 20 cm, furnished with a lower perforated plate containing a 2 cm high bed of quartz sand to sustain the ore.

2. The columns were packed with 225 grams of ore to be bioleached with a fraction of a size smaller than 30 screens (six).

3. For the leaching solutions, a modified 9K liquid culture environment was prepared ((3.0 g/L of $(NH_4)_2SO_4$, 0.5 g/L of $K_2HPO_4$, 0.5 g/L of $MgSO_4 \cdot 7H_2O$, 0.1 g/L of KCl and 0.1 g/L of $Ca(NO_3)_2$, 30 g/L of $FeSO_4 \cdot 7H_2O$) at pH=1,8, to which was added a mixture of Wenelen DSM 16786 and Licanantay DSM 17318, the DSM 17318 bacteria, both solutions with total bacteria concentrations higher than $5.6 \times 10^7$ bacteria/ml throughout the experiment, and a series with a sterile solution without adding bacteria, in order to compare the effects of this invention.

4. The Wenelen and Licanantay bacteria were grown in continuous chemostats using the modified 9K environment for the Wenelen, and in the case of the Licanantay, the same environment in which the ferrous sulfate was replaced with 10 g/L of elementary sulfur. The biomass concentrations obtained at the chemostat exit points are around $5 \times 10^8$ cells/ml for the Wenelen and around $2 \times 10^9$ cells/ml for the Licanantay. At the exit points of the chemostats, the solutions were filtered to avoid carrying solids and were afterwards diluted in the 9K environment for column inoculation and later diluted in the 9K environment for column inoculation with a total quantity in excess of $5 \times 10^7$ cells/ml.

5. The total quantity of bacteria in the column feed was measured daily by taking a microscopic count, whereas the count of specific bacteria in the same feed was carried out every 15 days, by means of molecular microbiological techniques, using real-time amplification by PCR (q-PRC), using specific splitters for both types of bacteria that are obtained as indicated in the applications for patents CL 2101-2005 and CL 2179-2005.

6. All the columns were injected at the base with a continuous flow of air equivalent to 200 liters (normal conditions)/$m^2$-hour per crosscut section of the column. In the case of the columns that were continuously inoculated with micro-organisms, the air was enriched with 0.5% of $CO_2$ in order to promote bacterial growth and activity.

7. All the columns were kept at room temperature (20±2° C.) throughout the experiment.

8. Sampling was carried out every 3 days, measuring copper in solution by means of atomic absorption spectrophotometry.

The characteristics of the ore used in this example are shown in Table 1 below:

TABLE 1

Mineralogical composition of the ore used in the Experiment 1 columns

| Species | % Cu |
|---|---|
| Chalcosite | 0.0 |
| Digenite | 0.9 |
| Covellite | 1.5 |
| Bornite | 0.0 |
| Chalcopyrite | 96.6 |
| Enargite | 0.3 |
| Tennantite | 0.0 |
| Oxidized | 0.8 |

The results represented in FIG. 1, show that the column that is not inoculated with bacteria is the one that shows the least relative recovery, achieving 1.5% after 110 days, a quantity that corresponds approximately to the dilution of oxide copper (acid leaching) and to a small fraction of the secondary sulfide (covellite and digenite) present in the ore. This column—in which the observed bacterial activity depends exclusively on the growth and characteristics of the native micro-flora—represents the industrial state-of-the-art operating conditions that do not involve the continuous inoculation of microorganisms or of ferric ions in bioleaching processes.

As also observed in FIG. 1, the continuous inoculation of microorganisms improves copper recovery from the ore, achieving a recovery of around 3.2% after 110 days when the Licanantay DSM 17318 is continuously inoculated on its own, a quantity that turns out to be approximately similar to the copper contained as oxide plus the total copper sulfides present in secondary form (covellite and digenite). The highest recovery observed is when the Wenelen DSM 16786-Licanantay DSM 17318 consortium is continuously inoculated, with a recovery of 4.8% in 110 days, a quantity of copper that shows bioleaching of the chalcopyrite (primary copper) in addition to the dilution of the secondary oxides and sulfides present. The simultaneous presence of sulfur-oxidizing (DSM 17318) and preferably iron-oxidizing (DSM 16786) microorganisms promotes the bioleaching of chalcopyrite, although this last bacteria is also able to grow by means of sulfur or elementary sulfur composites.

Example 2

In order to verify the effects indicated in the previous example in the case of secondary copper ore, the same protocol described in Example 1 was used, this time on a copper ore composed mainly of copper sulfide species of a secondary type, from the Codelco—Chile Radomiro Tomic Mine. The continuously inoculated bacteria were microorganisms of an *Acidithiobacillus thiooxidans* type, represented here by Licanantay DSM 17318, and with the continuous inoculation of the association formed by Wenelen DSM 16786 and Licanantay DSM 17318. The leaching solutions contain an average concentration of total iron of 0.17 g/l as Fe(III).

The characteristics of the ore used for this example are presented in Table 2 below:

TABLE 2

Mineralogical composition of the ore used in the Example 2 columns

| Species | % Cu |
|---|---|
| Chalcosite | 63.7 |
| Digenite | 26.8 |

TABLE 2-continued

Mineralogical composition of the ore used in the Example 2 columns

| Species | % Cu |
|---|---|
| Covellite | 1.9 |
| Bornite | 2.5 |
| Chalcopyrite | 0.1 |
| Enargite | 0.0 |
| Oxidized | 5.0 |

Figure 2:
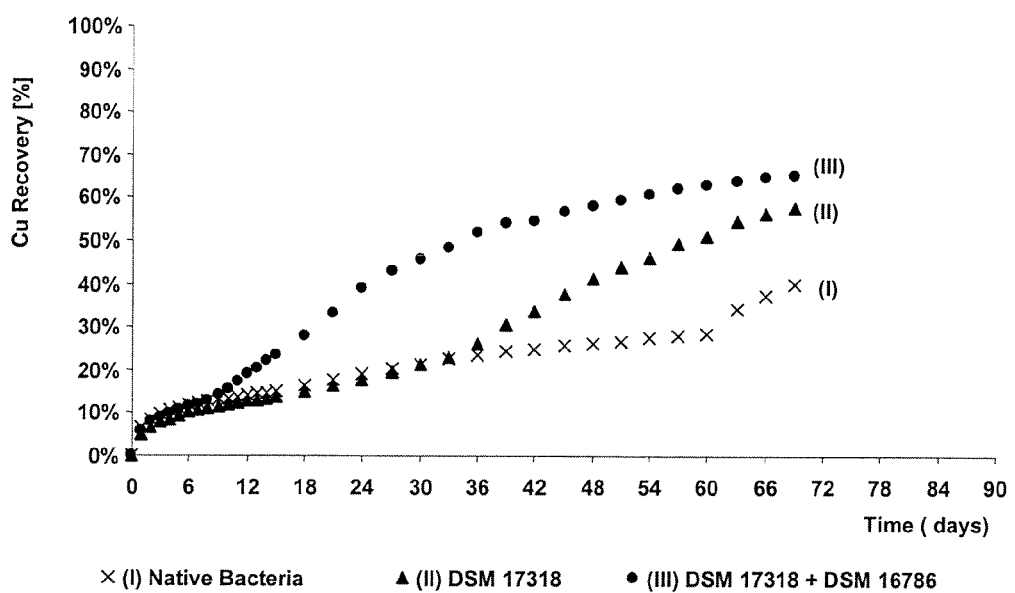
FIG. 2: This figure presents the copper recovery results for a column filled with secondary copper sulfide ore using (i) only native bacteria; (ii) using continuous inoculation of Licanantay DSM 17318 bacteria; and (iii) using continuous inoculation of the Licanantay DSM 17318 and Wenelen DSM 16789 bacteria association.

Regarding the results, as observed in FIG. 2, the column which is not inoculated with bacteria (i) the reason for which its bacterial activity is the one shown by the natural microorganisms present, and which represents the industrial state of the art operating conditions, shows a copper recovery of around 42% after 69 days.

In addition, as also observed in FIG. 2, the continuous inoculation of microorganisms improves the recovery of copper from the ore, achieving a recovery of around 58% after 69 days, when the Licanantay DSM 17318 is continuously inoculated on its own, and achieving a higher recovery when continuously inoculated with the Wenelen DSM 16786-Licanantay DSM 17318 association, with a recovery of around 65% after 69 days.

Likewise and also based on FIG. 2, to achieve a recovery of around 40%, which is currently achieved after 66 days using a state of the art methodology, this would be achieved in only 24 days using the present invention.

Example 3

With the purpose of verifying the effects indicated in the previous examples in the case of different concentrations of ferric ions, especially in the first stages of a process, the same protocol described in Example 1 was used, this time on a mixed sulfide copper ore from the Codelco—Chile Radomiro Tomic Mine (40.8% of total copper as Chalcopyrite). The continuously inoculated bacteria were microorganisms of the *Acidithiobacillus thiooxidans* type, represented here by Licanantay DSM 17318, and with the continuous inoculation of the association composed by Wenelen DSM 16786 and Licanantay DSM 17318.

The characteristics of the ore used in this example are presented in Table 3 below:

TABLE 3

Mineralogical composition of the ore used in the Example 3 columns
% In Weight Sulphide Based Base Ore

| Ore | % |
|---|---|
| Chalcopyrite | 0.89 |
| Chalcosite | 0.23 |
| Covellite | 0.06 |
| Bornite | 0.30 |
| Molybdenite | 0.04 |
| Pyrite | 1.13 |
| Oxides + Gangue | 97.00 |
| Total | 100.00 |

Figure 3:
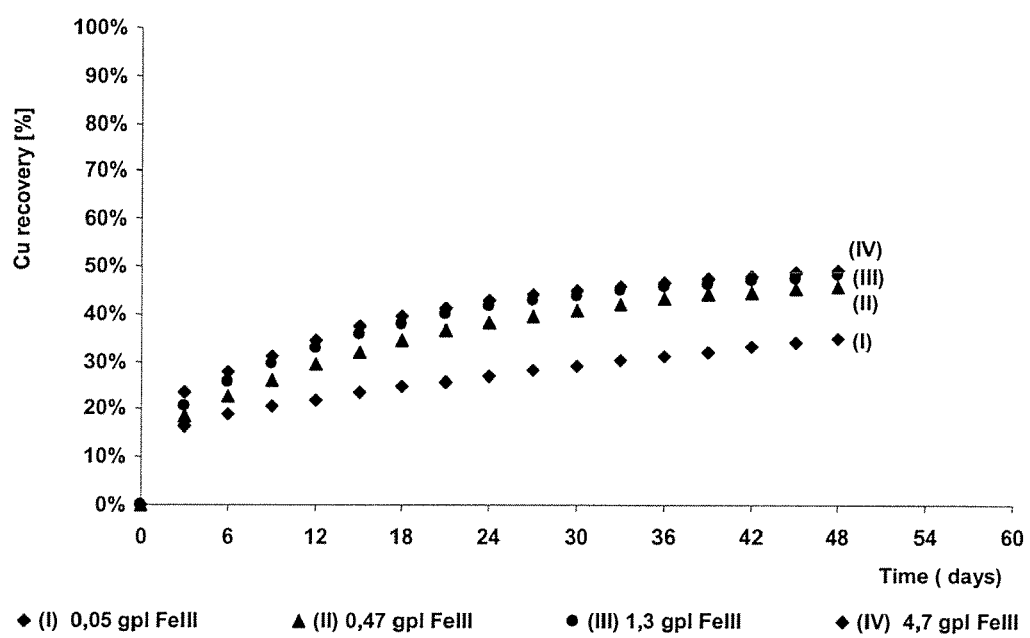
FIG. 3: This figure presents the copper recovery results for a column filled with a mixed sulfide ore (40.8% copper in weight as chalcopyrite) using different levels of iron with continuous inoculation of Licanantay DSM 17318 and Wenelen DSM 16786 bacteria, using (i) 0.05 g/L of Fe (III) (industrial water); (ii) 0.47 g/L Fe(III); (iii) 1.3 g/L Fe(III); and 4.7 g/L Fe(III).

Regarding the results, as observed in FIG. 3, the column in which the level of iron is equivalent to the one commonly found in industrial water of 0.05 g/L Fe, column (i) is the one that shows the lowest copper recovery of around 27% after 48 days of operation. Values from 0.47 g/L Fe(III), curve (ii), 1.3 g/L Fe(III) curve (iii) carry 42 to 44% of the total copper after 48 days of operation, whereas the highest copper recoveries (47%) are obtained in column (iv), in which a concentration of 4.7 g/L of Fe(III) is used, in addition to the continuous inoculation of the Wenelen DSM 16786-Licanantay DSM 17318 microorganism association, as in all the cases.

Based on the above, it is possible to establish a liquid-solid reaction model without reaction of the nucleus controlled by the chemical reaction and diffusional control to determine the bioleaching speeds to determine the effect of the Fe(III) concentration for each case in FIG. 3, in the first 48 days of the process (first sulfide bioleaching stage), correlating the fraction of copper extracted $\alpha_f$ from the chalcosite and covellite present for each period, according to the equation (Dixon, D. G., y Petersen, J., "*Modeling the dynamics of Heap Bioleaching for Process Improvements and innovation*", en *Hydrosulfide* 2004, *Proceeding of the International Colloquium on Hydrometallurgical Processing of Copper Sulfides*, 2004, pp 13-45):

$$\frac{d\alpha_1}{dt} = k_1 [Fe^{3+}]^{n_1} (1-\alpha_1)^{\phi_1} \tag{7}$$

where $\alpha_f$ represents the fraction of recovered copper (from 0 to 1), t the time, [$Fe^{3+}$] the concentration of ferric ions, $\phi_f$ the topological reaction coefficient and $k_1$ the pseudo-constant bioleaching kinetics for the first stages of the process (leaching of chalcosite and covellite). The results of the copper extraction were correlated by means of equation (7), obtaining a value of 0.096 for $k_1$ and of ⅔ for $\phi_f$.

Based on the results and applying the model, it is possible to establish that the strategies for obtaining the maximum speed of copper recovery from sulfide ore, for the first stages that involve bioleaching of secondary sulfide ore such as chalcosite and covellite, in addition to the continuous inoculation of sulfo-oxidizing and iron-oxidizing micro-organisms, such as those proposed in this invention, involves the highest possible initial contents of ferric ions in the bioleaching solutions (over 3 g/L Fe(III), compatible with controlling their precipitation as jarosite that could inhibit the recovery of copper by blocking the path of solutions to the inner part of the heaps or other on-site operations. Once the chalcosite bioleaching stage is in progress, the Fe(III) contents in the solution may be decreased when the progress of the secondary sulfide ore leaching increases (the value of $\alpha$ increases in equation 7), as when the consumption of ferric ions is decreased and a high oxidizing activity is established by the bacteria inside the bioleaching operations of heaps, dumps, tailing ponds and other on-site operations, the level may become lower as the process becomes self-sustaining due to the generation of iron and oxidizing action of the bacteria.

Based on the examples described, it is also evident that the process is favored by forced aeration in the range of 200 lt/h/m² and with addition of 0.1 to 1%, and preferably 0.5% more of $CO_2$ to the aeration, with the purpose of ensuring the supply of oxygen and carbon to the system, required by the oxidizing reactions and the oxidizing metabolism of the bacteria.

In the mining industry, it is known that the problem when operating sulfide ore leaching heaps or dumps is the relatively slow speed of recovery of the metals from the oxide ore. A significant increase in the copper extraction speed as seen in the examples would represent savings of approximately 20 to 40% in the bioleaching processing costs at an industrial scale (currently 10 to 15 US ¢lb of fine copper). These savings are because a higher recovery speed means lower ore inventories, lower pumping, aeration and irrigation costs, higher copper concentrations in the solutions for Solvent Extraction Plants, etc. Furthermore, speeds such as those observed with this innovation, would enable the use of on-off heaps—heaps where the ore is leached and removed from the same sheets as those currently used in oxide ore leaching with a 90 to 120 day cycle—instead of permanent heaps which are used in bioleaching with a 360-900 day cycle, with the consequent savings in surfaces, sheets and heaping systems. For a complete ore recovery in the slower stages of the process (covellite, bornite and principally chalcopyrite) the remaining copper would be recovered through bioleaching processes in dumps during a second phase.

The application of the present invention would represent savings, in the case of the operation of bacterial leaching of sulfide ore at Quebrada Blanca, in Chile's First Region, which produces approximately 200 tons of fine copper per day, of the current value of US$ 100 to 150 million dollars during the remainder of the useful lifespan of the mining project.

Example 4

In order to verify the effect of the continuous inoculation process on the bioleaching of ore in the leaching solution bacterial counts, columns were loaded with ore from the Andina mine, which was agglomerated with a ph 1.0 solution in columns similar to those described in Example 1, but with a net irrigation rate equivalent to 6 $lt \cdot hr^{-1} \cdot m^{-2}$. The ore mass (dry base) in the columns was of 500 g.

In order to obtain uniform and constant acidity conditions during the process (pH=1.6), the columns were continuously irrigated with acid solutions with sulfuric acid, initially at pH=1.0 and gradually adjusted to pH=1.6 until the desired pH was reached in a stable way in the exit solutions on day 16 of the experiment. During that period, bacterial counts were made by microscopy, without observing microorganisms in appreciable quantities with the detection limit of the technique ($>10^5$ micro-organisms/mL).

Up to day 16, the columns were continuously irrigated with a solution containing the 9K modified environment indicated in Example 1, containing around $5 \times 10^9$ microorganisms/mL of a mixture of the Wenelen DSM 16786 and Licanantay DSM 17318 microorganisms, where the appearance of microorganisms was observed in the exit solution of the column (denominated PLS) after 2 days (stage B) at levels of $7 \times 10^8$ microorganisms/mL, as well as the gradual increase in the PLS microorganism count until counts of $1 \times 10^9$ microorganisms/mL (stage C) were reached. During this period self-sustainability is achieved in the generation of the biomass which is characterized by the presence of microorganisms in the PLS in values similar to those of the feed solution (day 26).

Figure 4:
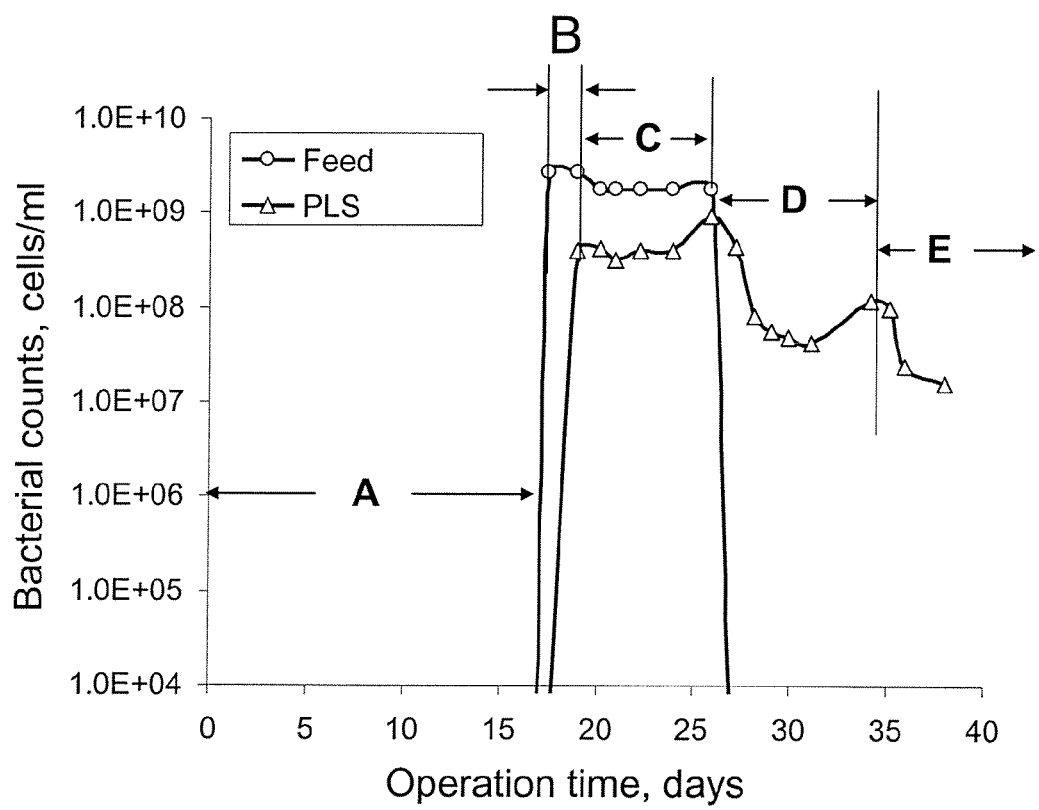
FIG. 4: This figure presents the results of the evolution of the total bacterial counts at the feed and exit points (PLS) for a column filled with a primary copper sulfide ore (98% of copper in weight as chalcopyrite) during the process of continuous inoculation with Licanantay DSM 17318 and Wenelen DSM 16786 bacteria. Stage A represents the acid conditioning period of the column (day 0 to 16); Stage B represents the period of continuous inoculation of the ore (day 16 to 18) without the presence of micro-organisms being observed in the exit solution (PLS); Stage C, is characterized by a gradual increase of microorganisms at the exit point (PLS—day 26); Stage D is characterized by the discontinuance of the continuous inoculation of microorganisms to the feed, preserving the presence of nutrients in the feed (up to day 34); Stage E is characterized by the acid wash of the column, discontinuing the presence of nutrients in the feed.

With the object of verifying the condition of self-sustainability in regard to the generation of biomass by the bioleaching process, the continuous inoculation of microorganisms was suspended as of day 26, maintaining however the presence of salts of the modified 9K environment in the feed solution, stage D. As seen in FIG. 4, the bacterial counts in the PLS gradually decrease up to day 32, at which time they start to grow until they reach a value of around $10^8$ microorganisms/mL, an unmistakable sign that the bioleaching process is self-sustaining in regard to the generation of biomass. Furthermore, the columns operate as biomass generation reactors, which may be used subsequently to continuously inoculate the bioleaching process of fresh ore and self-propagate the process.

When the presence of salts is eliminated in the 9K environment in the inoculation solution, Zone E, FIG. 4, it is possible to observe a decrease in the bacterial counts of the PLS solution, as bacterial growth inside the process is decreased due to a lack of nutrients.

The results indicated in this Example 4 show the advantages of the process of continuous inoculation of isolated microorganisms in rapidly obtaining leaching biomass in beds of sulfide ore submitted to a bioleaching process in significant quantities (more than $1 \times 10^7$ micro-organisms/mL), FIG. 4. It also shows that reaching the self-sustainability stage of bacterial growth enables ore beds in the shape of bioleaching heaps or dumps to act as true bioreactors, so that the micro-organisms present in the exit solutions (PLS) can be reused in the continuous inoculation of fresh ore, with the subsequent savings in the costs of biomass production to accelerate the recovery of metals in sulfide ore bioleaching industrial processes.

The invention claimed is:

1. A process to increase the bioleaching speed of ores or concentrates in an ore bed which is in the form of heaps, tailing dams, dumps, and other on-site bioleaching operations of sulfide metal species, the process comprising:
   inoculating the ore or concentrate to be bioleached with an inoculating solution containing isolated microorganisms of the *Acidithiobacillus thiooxidans* type, or together with isolated microorganisms of the *Acidithiobacillus ferrooxidans* type, with a total concentration of isolated microorganisms of about $1 \times 10^7$ cells/ml up to about $5 \times 10^9$ cells/ml, and wherein the bioleaching is carried out with or without the presence of native microorganisms that grow in the inoculating solution or of oxidizing ions; and
   carrying out the inoculation of the ore or concentrate until self-sustaining conditions of bacterial activity in the ore are reached,
   wherein self-sustaining conditions are reached when the bacterial count and iron-oxidizing activity of the bacteria in an effluent solution collected from the ore bed is similar in magnitude and composition to the bacterial count and iron-oxidizing activity of the bacteria in the inoculating solution.

2. The process in accordance with claim 1, wherein the isolated microorganism of the *Acidithiobacillus thiooxidans* type is Licanantay DSM 17318.

3. The process in accordance with claim 1, wherein the isolated microorganism of the *Acidithiobacillus ferrooxidans* type is Wenelen DSM 16786.

4. The process in accordance with claim 1, wherein the isolated *Acidithiobacillus thiooxidans* and *Acidithiobacillus ferrooxidans* microorganisms are inoculated at a ratio of *Acidithiobacillus thiooxidans*:*Acidithiobacillus ferrooxidans* in the range of 0.5:1 to 1:10, respectively.

5. The process in accordance with claim 1, wherein the oxidizing ions are present in the inoculating solution at a concentration of more than 2 g/L.

6. The process of claim 5, wherein the oxidizing ions, produced externally, are added to the inoculating solution until the ore bed reaches iron-oxidizing self-sustaining conditions.

7. The process in accordance with claim 5, wherein the oxidizing ions are ferric ions.

8. The process in accordance with claim 7, wherein the ferric ion is produced outside heaps, tailing dams, dumps, and other on-site bioleaching operations.

9. The process in accordance with claim 7, wherein the levels of ferric ion vary according to the processing stage, with concentrations higher than 2 g/L, and in which an oxidizing potential of the solution is higher than 800 mV in reference to a hydrogen electrode.

10. The process in accordance with claim 1, wherein the inoculating solution comprise salts of ammonium, potassium, phosphate, iron and magnesium to favor the growth and activity of bacterial oxidation in the process of ore bioleaching.

11. The process in accordance with claim 10, wherein the concentration of nutrients in the inoculating solution comprises approximately 3.0 g/L of $(NH_4)_2SO_4$, 0.5 g/L of $K_2HPO_4$, 0.5 g/L of $MgSO_4*7H_2O$, 0.1 g/L of KCl and 0.1 g/L of $Ca(NO_3)_2$, in addition to the leaching bacteria.

12. The process in accordance with claim 1, wherein air is continuously injected into the ore bed during the bioleaching processing of ores or concentrates, with flows of approximately 200 liters per $m^2$ of ore section per hour, with the objective of promoting bacterial growth.

13. The process in accordance with claim 1, wherein air enriched with $CO_2$ in a range of 0.1 to 1% by volume is continuously injected into the ore bed during the bioleaching processing of ores or concentrates.

14. The process in accordance with claim 13 wherein the injected air is enriched with $CO_2$ at about 0.5% by volume.

15. The process in accordance with claim 1, wherein ore beds that reach self-sustainability in the generation of biomass are used as bioreactors to generate leaching biomass which is used in the inoculation of sulfide ore submitted to the bioleaching process.

16. A process to increase the bioleaching speed of ores or concentrates in an ore bed which is in the form of heaps, tailing dams, dumps, and other on-site bioleaching operations of sulfide metal species, the process comprising:
   inoculating the ore or concentrate to be bioleached with an inoculating solution containing isolated microorganisms of the *Acidithiobacillus thiooxidans* type, or together with isolated microorganisms of the *Acidithiobacillus ferrooxidans* type, with a total concentration of isolated microorganisms of about $1\times10^{10}$ cells/ml, and wherein the bioleaching is carried out with or without the presence of native microorganisms that grow in the inoculation solution or of oxidizing ions; and
   carrying out the inoculation of the ore or concentrate until self-sustaining conditions of bacterial activity in the ore are reached,
   wherein self-sustaining conditions are reached when the bacterial count and iron-oxidizing activity of the bacteria in an effluent solution collected from the ore bed is similar in magnitude and composition to the bacterial count and iron-oxidizing activity of the bacteria in the inoculating solution.

* * * * *